US012607908B2

(12) United States Patent
Lim et al.

(10) Patent No.: US 12,607,908 B2
(45) Date of Patent: Apr. 21, 2026

(54) CAMERA LENS FOR VEHICLE AND CAMERA MODULE COMPRISING SAME

(71) Applicant: LG INNOTEK CO., LTD., Seoul (KR)

(72) Inventors: Jun Young Lim, Seoul (KR); Kyung Won Kim, Seoul (KR); Deok Ki Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 448 days.

(21) Appl. No.: 18/023,463

(22) PCT Filed: Aug. 24, 2021

(86) PCT No.: PCT/KR2021/011246
§ 371 (c)(1),
(2) Date: Feb. 27, 2023

(87) PCT Pub. No.: WO2022/045716
PCT Pub. Date: Mar. 3, 2022

(65) Prior Publication Data
US 2023/0314911 A1 Oct. 5, 2023

(30) Foreign Application Priority Data
Aug. 26, 2020 (KR) ........................ 10-2020-0108062

(51) Int. Cl.
*G03B 17/12* (2021.01)
*G02B 7/02* (2021.01)
(Continued)

(52) U.S. Cl.
CPC ............. *G03B 17/12* (2013.01); *G02B 7/028* (2013.01); *G02B 7/021* (2013.01); *G03B 30/00* (2021.01); *H04N 23/55* (2023.01)

(58) Field of Classification Search
CPC .......... G02B 7/02; G02B 7/021; G02B 7/022; G02B 7/023; G02B 7/025; G02B 7/026;
(Continued)

(56) References Cited

U.S. PATENT DOCUMENTS

| | | | |
|---|---|---|---|
| 4,723,833 A | 2/1988 | Yamada | |
| 2005/0243429 A1* | 11/2005 | Shulepova | ......... G02B 27/0018 359/601 |

(Continued)

FOREIGN PATENT DOCUMENTS

| | | |
|---|---|---|
| JP | 2005-309289 A | 11/2005 |
| JP | 2009-104100 A | 5/2009 |

(Continued)

*Primary Examiner* — Ephrem Z Mebrahtu
(74) *Attorney, Agent, or Firm* — Birch, Stewart, Kolasch & Birch, LLP

(57) ABSTRACT

A camera module disclosed in an embodiment of the invention includes a plurality of lenses stacked from an object side toward an image side; and spacers respectively disposed on an outer circumference between adjacent lenses, wherein at least a first lens of the plurality of lenses includes a first region having an effective diameter having an object-side first surface and an upper-side second surface; and a flange portion disposed around the first region and having a third surface extending outwardly from the first surface and a fourth surface extending outwardly from the second surface, wherein the flange portion includes a plurality of first grooves concave from the third surface of the flange portion toward the fourth surface, and a plurality of second grooves concave from the fourth surface toward the third surface, and wherein each of the third and fourth surfaces of the flange portion may face the spacers.

20 Claims, 12 Drawing Sheets

(51) Int. Cl.
    *G03B 30/00*        (2021.01)
    *H04N 23/55*      (2023.01)

(58) Field of Classification Search
    CPC .... G02B 7/027; G02B 7/028; G02B 13/0045;
             G03B 17/12; H04N 23/55; H04N 23/51;
             H04N 23/57; H04N 23/54; B60R 11/04
    See application file for complete search history.

(56)             References Cited

U.S. PATENT DOCUMENTS

| | | | |
|---|---|---|---|
| 2008/0055736 A1* | 3/2008 | Tsuji | C03B 11/08 |
| | | | 359/654 |
| 2009/0058012 A1 | 3/2009 | Walters | |
| 2009/0116118 A1 | 5/2009 | Frazier et al. | |
| 2009/0147381 A1* | 6/2009 | Chen | G02B 7/021 |
| | | | 359/819 |
| 2011/0043932 A1 | 2/2011 | Nomura et al. | |
| 2012/0140336 A1 | 6/2012 | Fujino et al. | |
| 2015/0323708 A1 | 11/2015 | Hashimoto et al. | |
| 2018/0011280 A1 | 1/2018 | Sung | |
| 2018/0314032 A1 | 11/2018 | Kim | |
| 2019/0278048 A1 | 9/2019 | Kanzaki | |
| 2020/0124774 A1 | 4/2020 | Hoshi et al. | |
| 2020/0310073 A1* | 10/2020 | Chou | G02B 7/022 |
| 2020/0357838 A1 | 11/2020 | Fukuyama et al. | |
| 2021/0294066 A1* | 9/2021 | Hirata | G03B 17/55 |

FOREIGN PATENT DOCUMENTS

| | | | |
|---|---|---|---|
| JP | 2011-48123 A | 3/2011 | |
| JP | 2018-66907 A | 4/2018 | |
| KR | 10-2008-0031299 A | 4/2008 | |
| KR | 10-2010-010675 A | 9/2010 | |
| KR | 10-2013-0076287 A | 7/2013 | |
| KR | 10-2016-00735940 A | 6/2016 | |
| KR | 10-2016-0104313 A | 9/2016 | |
| KR | 10-2017-0050546 A | 5/2017 | |
| KR | 10-2019-0107653 A | 9/2019 | |
| KR | 10-2020-0047535 A | 5/2020 | |

* cited by examiner (a)

(b)

(a)

(b)

CAMERA LENS FOR VEHICLE AND CAMERA MODULE COMPRISING SAME

CROSS REFERENCE TO RELATED APPLICATIONS

This application is the National Phase of PCT International Application No. PCT/KR2021/011246, filed on Aug. 24, 2021, which claims priority under 35 U.S.C. § 119(a) to Patent Application No. 10-2020-0108062, filed in the Republic of Korea on Aug. 26, 2020, all of which are hereby expressly incorporated by reference into the present application.

TECHNICAL FIELD

An embodiment of the invention relates to a camera lens and a camera module for a vehicle.

BACKGROUND ART

ADAS (Advanced Driving Assistance System) is an advanced driver assistance system for assisting the driver in driving, and consists of sensing the situation ahead, determining the situation based on the sensed result, and controlling the vehicle behavior based on the situation judgment. For example, an ADAS sensor device detects a vehicle ahead and recognizes a lane. Then, when the target lane, target speed, and forward target are determined, the vehicle's Electrical Stability Control (ESC), EMS (Engine Management System), and MDPS (Motor Driven Power Steering) are controlled. Typically, ADAS may be implemented as an automatic parking system, a low-speed city driving assistance system, a blind spot warning system, and the like. Sensor devices for sensing the situation ahead in ADAS include a GPS sensor, laser scanner, front radar, lidar, etc. The most representative is a front camera for capturing the front of the vehicle.

In recent years, research on a sensing system for sensing the surroundings of a vehicle for driver's safety and convenience has been accelerated. The vehicle detection system is used for various purposes, such as detecting objects around the vehicle to prevent collisions with objects not recognized by the driver, and automatically parking by detecting empty spaces, and provides the most essential data for automatic vehicle control. As such a detection system, a method using a radar signal and a method using a camera are commonly used. A camera module for a vehicle is used by being built into a front and rear surveillance camera and a dashboard camera in an automobile, and takes a picture or video of a subject. Since the vehicle camera module is exposed to the outside, photographing quality may deteriorate due to humidity and temperature. In particular, the camera module has a problem in that optical characteristics are changed depending on the ambient temperature and the material of the lens.

DISCLOSURE

Technical Problem

An embodiment of the invention may provide a lens for a vehicle in which a flange portion outside an effective diameter through which light is transmitted have a plurality of grooves. An embodiment of the invention may provide a lens for a vehicle in which grooves are disposed on the upper and lower surfaces of the flange portion outside the effective diameter. An embodiment of the invention may provide a camera module in which the flange portion of one or more lenses have grooves. An embodiment of the invention may provide a camera module in which both sides of at least one flange portion among a plurality of lenses have grooves. An embodiment of the invention may provide a camera module in which grooves are formed on at least one flange portion of a plurality of lenses and a spacer is opposed to the grooves. An embodiment of the invention may provide a camera module including a lens or/and a spacer having at least one groove or buffer structure on upper and lower surfaces. An embodiment of the invention may provide a camera module having a flange portion having grooves on upper and lower portions to alleviate contraction and expansion of a lens.

Technical Solution

A lens for a vehicle according to an embodiment of the invention includes a first region having an effective diameter having an object-side first surface and an image-side second surface; and a flange portion disposed around the first region and having a third surface extending outwardly from the first surface and a fourth surface extending outwardly from the second surface, wherein the flange portion comprises: a plurality of first grooves concave from the third surface toward the fourth surface of the flange portion, and a plurality of second grooves concave from the fourth surface toward the third surface.

According to an embodiment of the invention, each of the plurality of first grooves may have a ring shape having different radii in the third surface and may be arranged in a concentric circle shape. Each of the plurality of second grooves has a ring shape having different radii in the fourth surface and may be arranged in concentric circle shape, and a low point of each of the plurality of first grooves and a high point of each of the plurality of second grooves may be arranged to be shifted from each other. A distance between the plurality of first grooves may be smaller than a maximum width of each of the first grooves, and a distance between the plurality of second grooves may be smaller than a maximum width of the second grooves. A minimum distance between the plurality of first grooves and an upper edge of the first region may be smaller than a minimum distance between the plurality of second grooves and a lower edge of the first region. According to an embodiment of the invention, the first surface may be convex toward the object side, and the second surface may be concave toward the object side.

According to an embodiment of the invention, each of the plurality of first grooves has a first outer surface adjacent to the flange portion and a first inner surface adjacent to the first region, and the first inner surface and the first outer surface may be inclined based on a straight line passing through the low point of the first groove and parallel to the optical axis. Each of the plurality of second grooves has a second outer surface adjacent to the flange portion and a second inner surface adjacent to the first region, and the second inner surface and the second outer surface may be inclined based on a straight line passing through the high point of the second groove and parallel to the optical axis.

According to an embodiment of the invention, an inclination angle of the first inner surface based on the straight line parallel to the optical axis is equal to or greater than an inclination angle of the first outer surface, and an inclination angle of the second inner surface based on the straight line parallel to the optical axis may be equal to or smaller than an inclination angle of the second outer surface. The shortest distance between a virtual first straight line connecting low points of the first grooves and a virtual second straight line connecting low points of the second grooves in a first direction perpendicular to the optical axis may be in a range of 20% to 40% of a thickness of the flange portion.

A camera module according to an embodiment of the invention includes a plurality of lenses stacked from an object side toward an image-side; and spacers respectively disposed on outer circumferences between adjacent lenses, wherein at least a first lens of the plurality of lenses includes a first region having an effective diameter having an object-side first surface and an image-side second surface; and a flange portion disposed around the first region and having a third surface extending outwardly from the first surface and a fourth surface extending outwardly from the second surface, wherein the flange portion comprises: a plurality of first grooves concave from the third surface toward the fourth surface; and a plurality of second grooves concave from the fourth surface toward the third surface, and each of the third and fourth surfaces of the flange portion may face the spacers.

According to an embodiment of the invention, a lens holder disposed outside the plurality of lenses may be included, and the lens holder may be made of a metal material. The first lens may be made of a plastic material, and the plurality of lenses may include a second lens made of glass disposed on the object side or the image side of the first lens.

According to an embodiment of the invention, each of the plurality of first grooves has a ring shape having different radii on the third surface and is arranged in a concentric circle shape, and each of the plurality of second grooves has a ring shape having different radii on the fourth surface and is arranged in a concentric circle shape, and the low point of each of the plurality of first grooves and the high point of each of the plurality of second grooves may be disposed to be shifted from each other. A distance between the plurality of first grooves may be smaller than a maximum width of each of the first grooves, and a distance between the plurality of second grooves may be smaller than a maximum width of each of the second grooves.

According to an embodiment of the invention, a minimum distance between the plurality of first grooves and an upper edge of the first region may be smaller than a minimum distance between the plurality of second grooves and a lower portion of the first region. According to an embodiment of the invention, the first surface of the first lens may be convex toward the object, and the second surface of the first lens may be concave toward the object.

According to an embodiment of the invention, each of the plurality of first grooves has a first outer surface adjacent to the flange portion and a first inner surface adjacent to the first region, and the first inner surface and the first outer surface are the first groove may be inclined based on a straight line passing through low points of the first grooves and parallel to the optical axis, each of the plurality of second grooves has a second outer surface adjacent to the flange portion and a second inner surface adjacent to the first region, and the second inner surface and the second outer surface may be inclined based on a straight line passing through higher points of the second grooves and parallel to the optical axis.

According to an embodiment of the invention, an inclination angle of the first inner surface based on a straight line parallel to the optical axis may be equal to or greater than an inclination angle of the first outer surface, and an inclination angle of the second inner surface based on a straight line parallel to the optical axis may be equal to or smaller than an inclination angle of the second outer surface. The shortest distance between a virtual first straight line connecting the low points of the first groove and a virtual second straight line connecting the low points of the second groove in a first direction perpendicular to the optical axis may be in a range of 20% to 40% of a thickness of the flange portion. The spacers may be respectively disposed on the plurality of first grooves and the plurality of second grooves.

According to an embodiment of the invention, the image sensor; a cover glass between the image sensor and the plurality of lenses; and an optical filter between the cover glass and the plurality of lenses may include.

Advantageous Effects

In an embodiment of the invention, the grooves of the flange portion of the lens are formed in an axial direction orthogonal to the optical axis, thereby suppressing a change in optical characteristics due to expansion and contraction of the lens in a direction orthogonal to the optical axis. According to an embodiment of the invention, grooves are formed in a flange portion of a lens made of plastic in an axial direction orthogonal to an optical axis, thereby suppressing a change in optical characteristics in a lens made of plastic. According to an embodiment of the invention, a thermal deformation of the lens may be compensated for by disposing a buffer structure on the flange portion of the lens having relatively large thermal change.

In an embodiment of the invention, a groove is disposed in the flange portion of the lens and spacers are disposed on and under the flange portion, thereby suppressing deformation due to expansion of the lens. It is also possible to prevent permanent deformation of the lens.

According to an embodiment of the invention, it is possible to improve the optical reliability of a camera module having at least one lens having a buffer structure on a flange portion. In addition, the reliability of the camera module and the vehicle camera device having the same may be improved.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. In addition, several embodiments described below can be combined with each other unless specifically stated that they cannot be combined with each other. In addition, unless otherwise specified, descriptions for other embodiments may be applied to missing parts in the description of any one of several embodiments.

Embodiment

Figure 1:
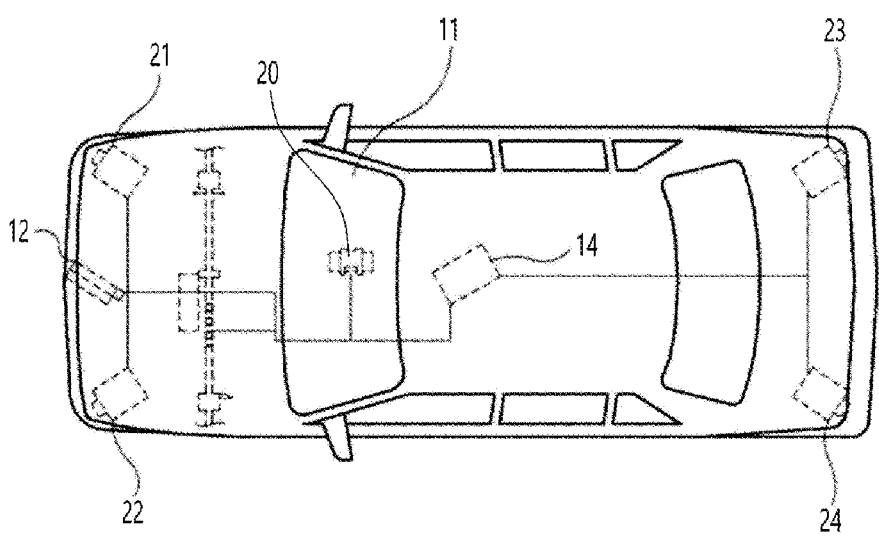
FIG. 1 is an example of a plan view of a vehicle to which a camera module according to an embodiment of the invention is applied.

FIG. 1 is an example of a plan view of a vehicle to which a camera module according to an embodiment of the invention is applied. Referring to FIG. 1, a vehicle camera system according to an embodiment of the invention includes an image generating portion 11, a first information generating portion 12, a second information generating portion 21, 22, 23, and 24 and a control portion 14.

The image generating portion 11 may include at least one camera module 20 disposed in the vehicle, and captures the front side of the vehicle and/or the driver to generate a front image of the vehicle or an image inside the vehicle. In addition, the image generating portion 11 may generate an image of the surroundings of the own vehicle by capturing not only the front of the own vehicle but also the surroundings of the own vehicle in one or more directions using the camera module 20. Here, the front image and the surrounding image may be digital images, and may include color images, black and white images, and infrared images. In addition, the front image and the surrounding image may include still images and moving images. The image generating portion 11 provides the driver's image, front image, and surrounding image to the control portion 14. Subsequently, the first information generating portion 12 may include at least one radar or/and camera disposed in the own vehicle, and detects the front side of the own vehicle to generate first detection information. Specifically, the first information generating portion 12 is disposed in the own vehicle and generates first detection information by detecting the location and speed of vehicles located in front of the own vehicle, presence and location of pedestrians, and the like. Using the first detection information generated by the first information generating portion 12, control may be performed to maintain a constant distance between the host vehicle and the preceding vehicle, and it is possible to increase the stability of vehicle operation in a predetermined specific case, such as when the driver wants to change the driving lane of the vehicle or when parking in reverse. The first information generating portion 12 provides the first sensing information to the control portion 14.

The second information generating portions 21, 22, 23, and 24 detect each side of the host vehicle based on the front image generated from the image generating portion 11 and the first detection information generated from the first information generating portion 12 to generate second sensing information. Specifically, the second information generating portions 21, 22, 23, and 24 may include at least one radar or/and camera disposed in the host vehicle, and may include locations of vehicles located on the side of the host vehicle, and may be sensed speed and captured an image. Here, the second information generating portions 21, 22, 23, and 24 may be disposed at both front corners, side mirrors, and rear center and rear corners of the vehicle, respectively. The vehicle camera system may include a camera module described in the following embodiment, and may protect vehicles and objects from autonomous driving or surrounding safety by providing or processing information acquired through driver monitoring, the front, rear, side, or corner regions of the own vehicle to the user.

The plurality of optical systems of the camera module according to an embodiment of the invention may be mounted in a vehicle in order to enhance safety regulation, self-driving function, and convenience. In addition, the optical system of the camera module is applied to a vehicle as a component for controlling a lane keeping assistance system (LKAS), a lane departure warning system (LDWS), and a driver monitoring system (DMS). Such a camera module for a vehicle may realize stable optical performance even when the ambient temperature changes and provides a module with a competitive price, thereby securing reliability of vehicle components.

In the description of the invention, the first lens means the lens closest to the object side, and the last lens means the lens closest to the image side (or a surface of sensor). The last lens may include a lens adjacent to the image sensor. Unless otherwise specified in the description of the invention, all units for the radius, thickness/distance, TTL, etc. of the lens are mm. In this specification, the shape of the lens is shown based on the optical axis of the lens. For example, a fact that the object side of the lens is convex or concave means that the vicinity of the optical axis is convex or concave on the side of the object of the lens, and that the periphery of the optical axis is not convex or concave. Therefore, even when it is described that the object side of the lens is convex, the portion around the optical axis on the object side of the lens may be concave or vice versa. In this specification, it is noted that the thickness and radius of curvature of the lens are measured based on the optical axis of the lens. That is, the convex surface of the lens means that the surface of the lens in the region corresponding to the optical axis has a convex shape, and the concave surface of the lens means that the surface of the lens in the region corresponding to the optical axis has a concave shape. Also, the "object-side surface" may refer to a surface of a lens facing the object side based on an optical axis, and the "image-side surface" may refer to a surface of a lens facing an imaging surface based on an optical axis.

Figure 2:
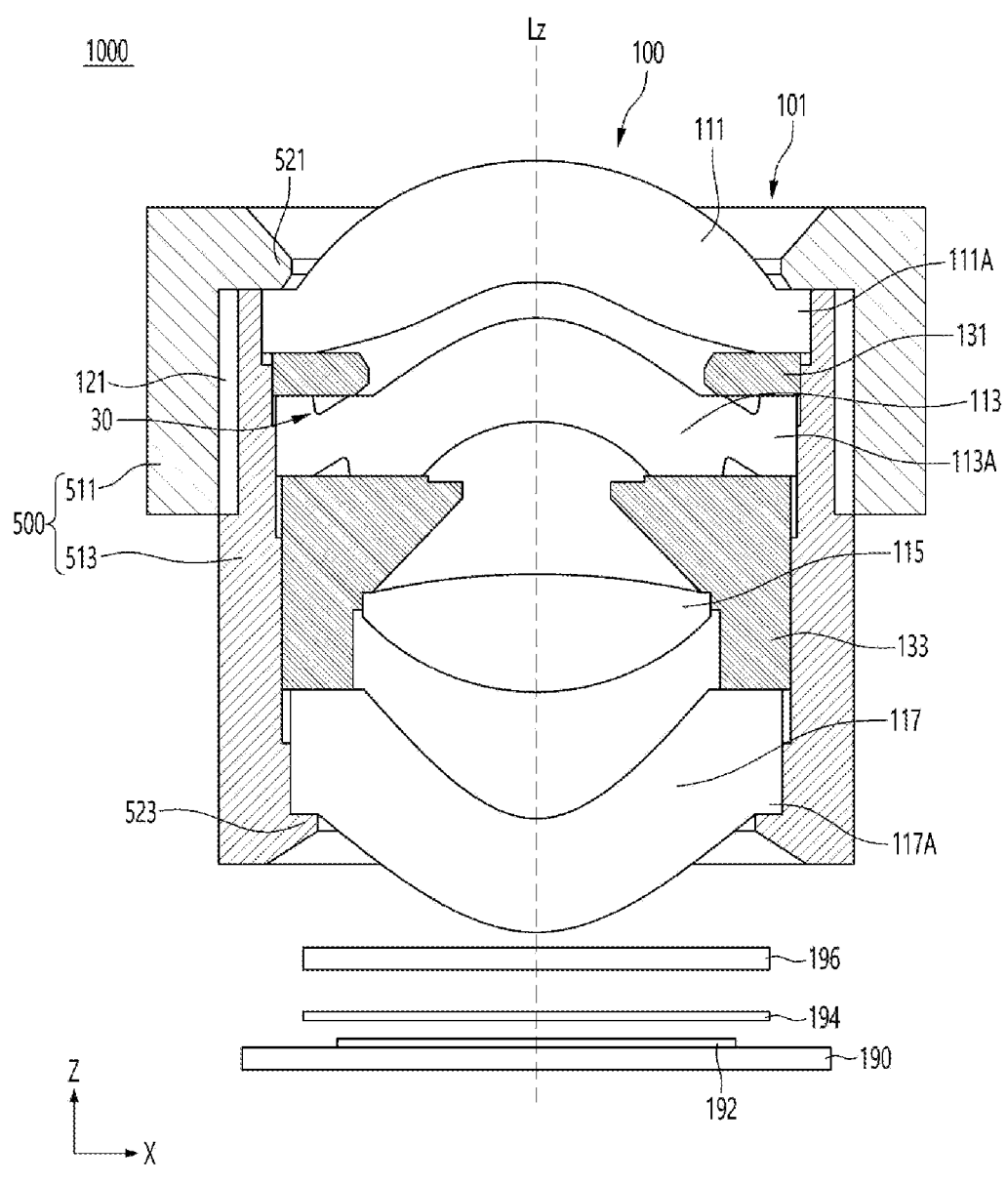
FIG. 2 is a side cross-sectional view showing an example of a camera module according to an embodiment of the invention.
Figure 3:
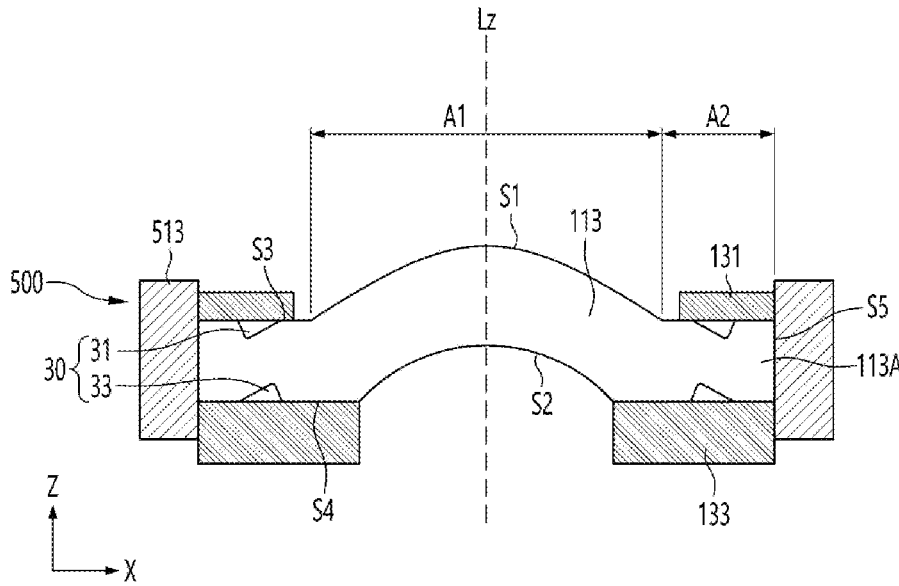
FIG. 3 is a first example of a side cross-sectional view of a lens having a buffer structure on a flange portion in the camera module of FIG. 2.
Figure 4:
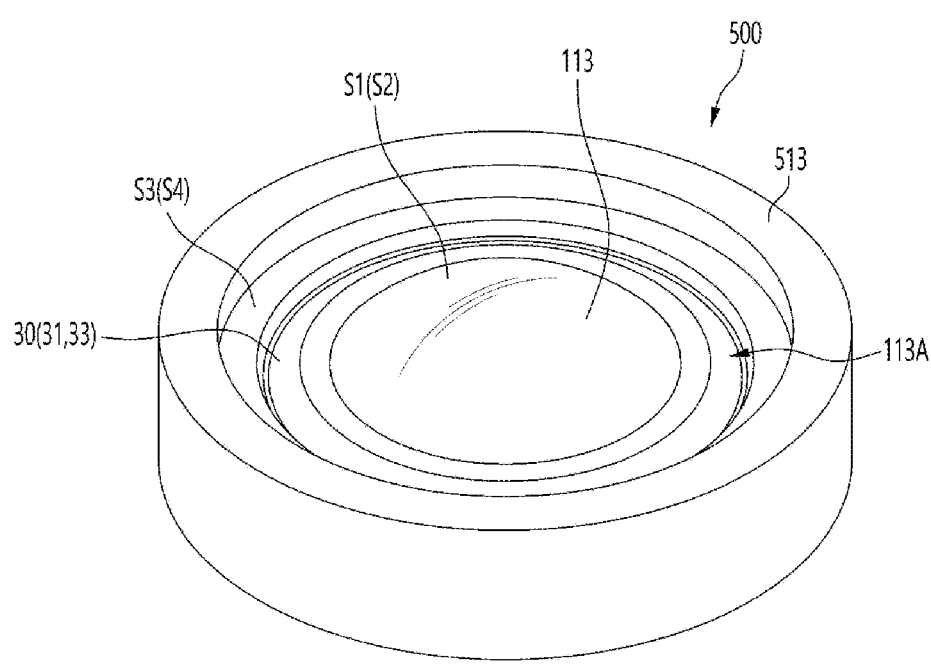
FIG. 4 is an example of a perspective view of the lens of FIG. 3.
Figure 5:
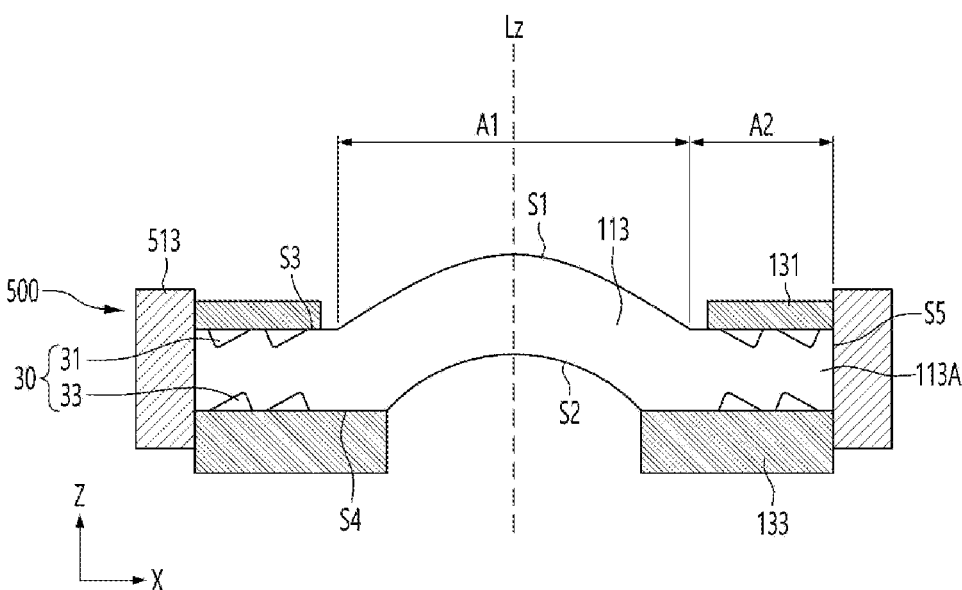
FIG. 5 is a second example of a buffer structure of a flange portion in the camera module of FIG. 2.
Figure 6:
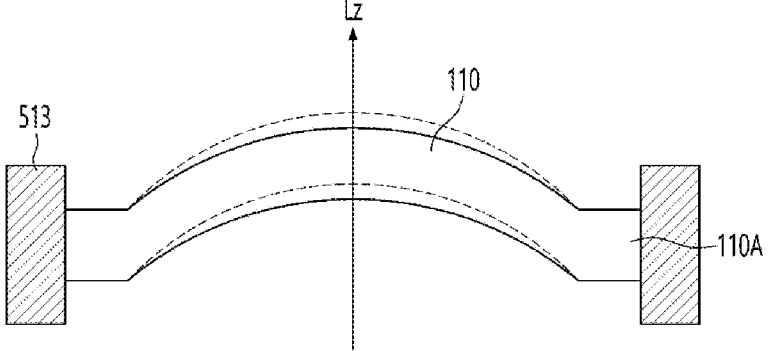
FIG. 6 is a view showing an example in which a lens having a flange portion without a buffer structure in a comparative example is deformed.
Figure 7:
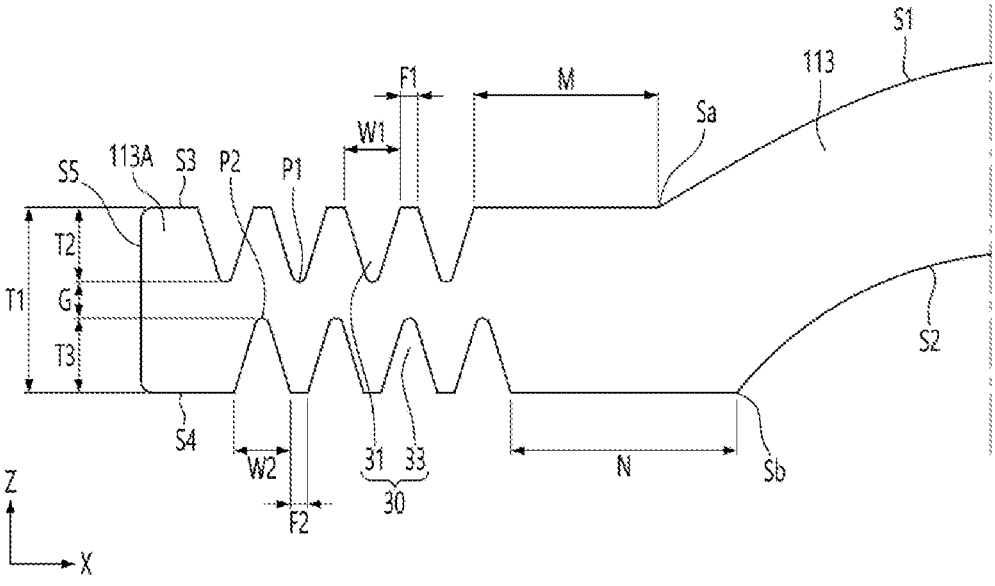
FIG. 7 is a second example of a buffer structure of a flange portion in the camera module of FIG. 2.
Figure 8:
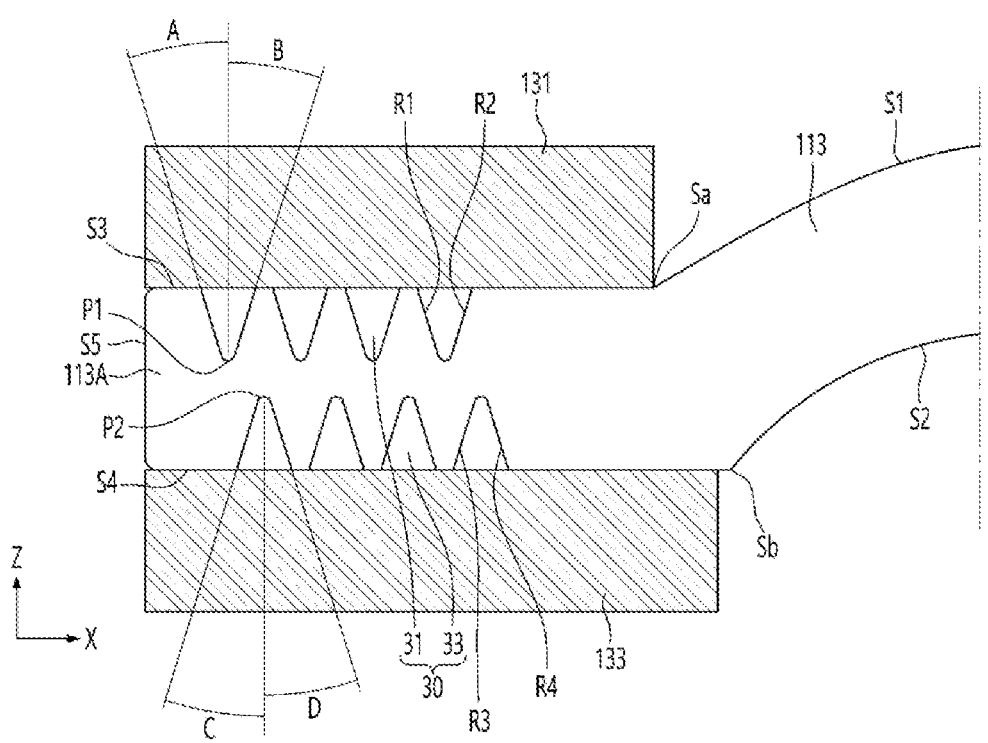
FIG. 8 is a detailed configuration diagram showing a relationship between a flange portion and a spacer of the lens of FIG. 7.
Figure 9:
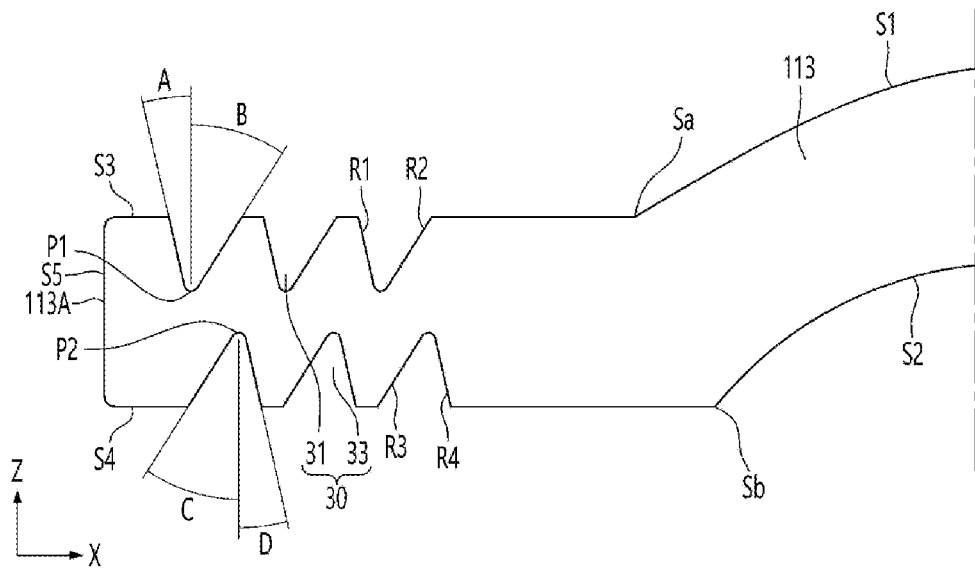
FIG. 9 is a diagram explaining the buffer structure of the flange portion of the lens of FIG. 7.
Figure 10:
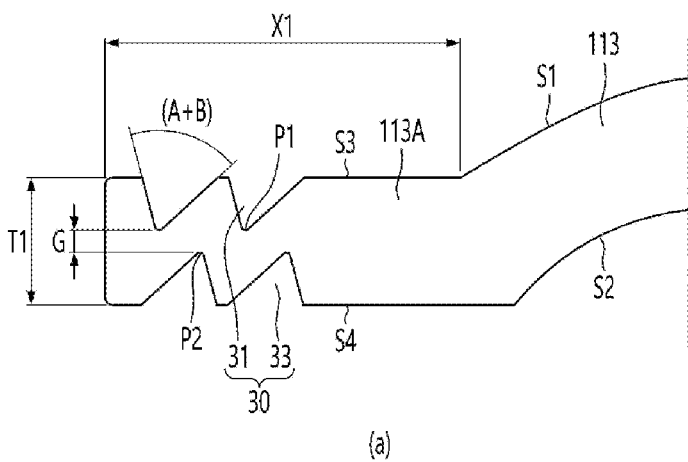
FIG. 10(A)(B) are diagrams comparing the distances between upper and lower grooves in the flange portion of the lens of FIG. 7.
Figure 10:
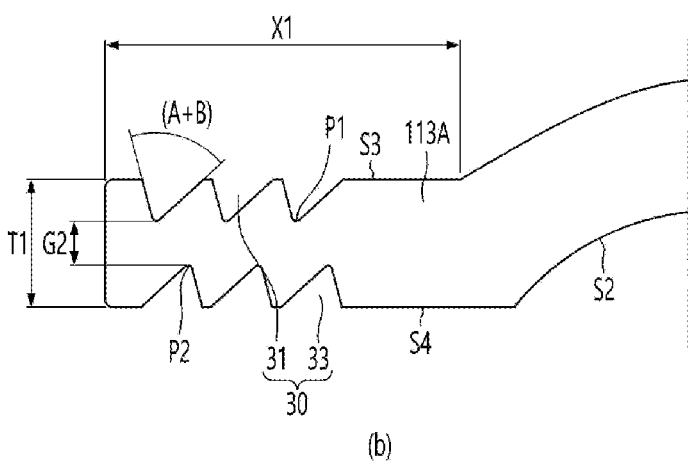

FIG. 2 is a side cross-sectional view showing an example of a camera module according to an embodiment of the invention, and FIG. 3 is a first example of a side cross-sectional view of a lens having a buffer structure on a flange portion in the camera module of FIG. 2, and FIG. 4 is an example of a perspective view of a lens of FIG. 3, FIG. 5 is a second example of a buffer structure of a flange portion in the camera module of FIG. 2, FIG. 6 is a view showing an example in which a lens having a flange portion without a buffer structure in a comparative example is deformed, FIG. 7 is a second example of a buffer structure of a flange portion in the camera module of FIG. 2, FIG. 8 is a detailed configuration diagram showing a relationship between a flange portion and a spacer of the lens of FIG. 7, FIG. 9 is a diagram explaining the buffer structure of the flange portion of the lens of FIG. 7, and FIG. 10(A)(B) are diagrams comparing the distances between upper and lower grooves in the flange portion of the lens of FIG. 7.

Referring to FIGS. 2 to 4, the camera module 1000 according to an embodiment of the invention includes a housing 500, a lens portion 100 having a plurality of lenses 111, 113, 115, and 117, spacers 131 and 133, and a main board 190 and an image sensor 192. The camera module 1000 may include a cover glass 194 and an optical filter 196 between the lens portion 100 and the image sensor 192.

In the lens portion 100, at least three or more lenses may be stacked, for example, three to seven lenses or three to five lenses may be stacked. The lens portion 100 may include at least three or more solid lenses, and the solid lenses may include at least one or two or more plastic lenses. For example, the lens portion 100 may be used by mixing a plastic lens and a glass lens. In the case of using a plastic lens in a vehicle, the price may be lowered compared to a lens made of glass, and the path of light may be easily controlled by providing aspheric surfaces on the incident side surface and the exit side surface. In this case, as shown in FIG. 6, the plastic lens 110 may expand or contract according to temperature change, and when the flange portion 110A does not have a buffer structure, the incidence side surface and the exit side surface of the lens 110 may be separated. The height may vary and may affect the optical properties of the lens 110.

An embodiment of the invention provides a buffer structure or member to a plastic lens used in the lens portion 100 to suppress a change in optical characteristics. The buffer structure may be provided on the flange portion. Here, the plastic material may be 5 times higher than the coefficient of thermal expansion (CTE) of the glass material, and the change value (dN/dT) of the refractive index as a function of temperature may be 10 times lower than the glass material. Here, dN is a change value of the refractive index of the lens, and dT represents a change value of the temperature.

For convenience of description, the lens portion 100 may be described as an example in which a first lens 111, a second lens 113, a third lens 115, and a fourth lens 117 stacked from the object side toward the image sensor 192 are aligned in an optical axis Lz, and a buffer structure is applied to at least one lens. For example, the lens made of a plastic material having a buffer structure may be a lens closest to the object side, or may be one or two lenses disposed between the image sensor 192 and the lens closest to the subject. The buffer structure may include a structure having grooves on upper and lower surfaces of the lens. The second lens 113 made of plastic according to an embodiment of the invention has a buffer structure 30, which may be buffered when the volume of the second lens 113 expands according to the ambient temperature. The buffer structure 30 may be provided to the flange portion 113A of the second lens 113 and may be provided to provide elasticity in a first direction or a circumferential direction orthogonal to the optical axis Lz.

The housing 500 includes a cover 511 and a lens holder 513, and may have an opening 101 penetrating from top to bottom. The cover 511 and the lens holder 513 may be integrally formed, or may be separated from or combined with each other. The cover 511 may be a cover coupled to the outer periphery of the lens holder 513 from the top, an inner protrusion 521 of the cover 511 may support the circumference of the first lens 111, and an inner protrusion 523 of the lens holder 513 may be disposed under the flange portion 117A of the fourth lens 117. The lens holder 513 protects and supports the outer surface of the lens portion 100. The lens holder 513 supports outer surfaces of the plurality of lenses 111, 113, 115, and 117. The lens holder 513 may be a lens barrel, and may be provided with one or a plurality of barrels. The top view shape of the housing 500 may include a circular column shape or a polygonal column shape. The housing 500 may be formed of a material such as resin, plastic, or metal. A hydrophilic material may be coated or coated on the surface of the housing 500. Here, the lens holder 513 may be formed of a metal material, for example, it may be selected from Al, Ag, or Cu material, and may be Al or an Al alloy. When the lens holder 513 is made of metal, heat transmitted in the lateral direction of the lenses 111, 113, 115, and 117 may be dissipated, and thermal deformation of the lenses 111, 113, 115, and 117 may be suppressed. Although the heat dissipation effect of the camera module 1000 may be improved by using the lens holder 513 made of metal, the difference in coefficient of thermal expansion (CTE) between the lens and, in particular, the lens made of plastic becomes large. That is, when the diameter of the plastic lens is 4 mm or more, length deformation of 15 μm or more may occur. Here, a gap may be included between at least one of the plurality of lenses 111, 113, 115, and 117 and the lens holder 513.

Each of the lenses 111, 113, 115, and 117 may include an effective region having an effective diameter through which light is incident, and flange portions 111A, 113A, and 117A that are non-effective regions outside the effective region. The non-effective region may be an area in which light is blocked by the spacers 131 and 133. The flange portions 111A, 113A, and 117A may extend in a circumferential direction with respect to the optical axis Lz in effective regions of the lenses 111, 113, 115, and 117. At least one 115 of the lenses 111, 113, 115, and 117 may have no flange or be provided with a relatively short length.

The first lens 111 is a lens closest to the subject, and at least one or both of an upper surface through which light is incident and a lower surface through which light exits may be spherical or aspheric. An upper or lower surface of the first lens 111 may be concave or convex. The first lens 111 may be made of a plastic material when the camera module 1000 is exposed to light from the inside or outside of the vehicle to prevent discoloration, and may be made of glass or plastic material when the camera module 1000 is placed inside the vehicle. The second lens 113 may be made of a plastic material. The second lens 113 is disposed between the first lens 111 and the third lens 115, and may have a buffer structure 30 on the flange portion 113A. The third lens 115 may be made of glass or plastic. The fourth lens 117 is a lens closest to the image sensor 192 and may be made of glass or plastic. The upper and/or lower surfaces of the second lens 113, the third lens 115, and the fourth lens 117 may be spherical or aspheric, but are not limited thereto. In the case where the lens(s) is made of a plastic material, the invention may include a buffer structure disclosed below.

The lenses 111, 113, 115, and 117 of the lens portion 100 may be coupled in the lens holder 513 of the housing 500 from the upper portion toward the sensor side, coupled in the opposite direction, or coupled in both directions. A gasket 121 may be included between the cover 511 and the lens holder 513, and the gasket 121 may be a waterproof ring.

The spacers 131 and 133 may be disposed outside the lenses 111, 113, 115, and 117 of the lens portion 100, and the spacers 131 and 133 may block light leaking or entering the outside and adjust the distance between two adjacent lenses. The spacers 131 and 133 may be defined as spacers. For example, the spacers 131 and 133 may include a first spacer 131 disposed on the outer circumference of the first lens 111 and the second lens 113, and a second spacer 133 disposed on the outer circumference of the second lens 131 and the fourth lens 117. The second spacer 133 may have an inner peripheral surface supporting an outside of the third lens 115.

An upper surface of the second spacer 133 may contact the second lens 113. A lower surface of the second spacer 133 may contact the fourth lens 117. The second spacer 133 may include a first portion disposed between the flange portion 113A of the second lens 113 and the lens holder 513, and a second portion between the flange portion 117A of the fourth lens 117 and the lens holder 513. The second spacer 133 may protect the outside of the third lens 115 and the outside of the second lens 113 and the fourth lens 117.

The first spacer 131 and the second spacer 133 may be made of the same material or different materials, for example, they may be made of a material that absorbs light. The first and/or second spacers 131 and 133 may include a poly ethylene film (PE) film or a polyester (PET) film. As another example, the first or/and second spacers 131 and 133 may have a metal or alloy and an oxide film formed on their surface. A material included in the metal or alloy may include at least one of In, Ga, Zn, Sn, Al, Ca, Sr, Ba, W, U, Ni, Cu, Hg, Pb, Bi, Si, Ta, H, Fe, Co, Cr, Mn, Be, B, Mg, Nb, Mo, Cd, Sn, Zr, Sc, Ti, V, Eu, Gd, Er, Lu, Yb, Ru, Y, and La. The oxide film may be an oxide material treated with black oxide or brown oxide using copper.

The image sensor 192 may be disposed on the main board 190. The image sensor 192 may be mounted, seated, contacted, fixed, temporarily fixed, supported, or coupled to the main substrate 190 on a plane intersecting the optical axis. Alternatively, according to another embodiment, the main board 190 may have a groove or hole (not shown) capable of accommodating the image sensor 192, and the embodiment is not limited to a specific form in which the image sensor 192 is disposed on the main board 190. The main board 190 may be a rigid PCB or an FPCB.

The image sensor 192 may perform a function of converting light passing through the lens portion 100 into image data. A sensor holder may be disposed under the housing 500 to surround the image sensor 192 and protect the image sensor 192 from external foreign substances or shocks. The image sensor 192 may be any one of a charge coupled device (CCD), complementary metal-oxide semiconductor (CMOS), CPD, and CID. When the number of image sensors 192 is plural, one may be a color (RGB) sensor and the other may be a black and white sensor.

The optical filter 196 may be disposed between the lens portion 100 and the image sensor 192. The optical filter 196 may filter light corresponding to a specific wavelength range with respect to light passing through the lenses 111, 113, 115, and 117. The optical filter 196 may be an infrared (IR) blocking filter that blocks infrared rays or an ultraviolet (UV) blocking filter that blocks ultraviolet rays, but the embodiment is not limited thereto. The optical filter 196 may be disposed on the image sensor 192. The cover glass 194 is disposed between the optical filter 196 and the image sensor 192, protects the upper portion of the image sensor 192, and may prevent the reliability of the image sensor 192 from deteriorating.

The camera module 1000 according to an embodiment of the invention may include a driving member (not shown), and the driving member may move or tilt the lens barrel having at least one of lenses in direction of the optical axis or/and a direction orthogonal to the optical axis direction. The camera module may include an auto focus (AF) function and/or an optical image stabilizer (OIS) function.

Figure 13:
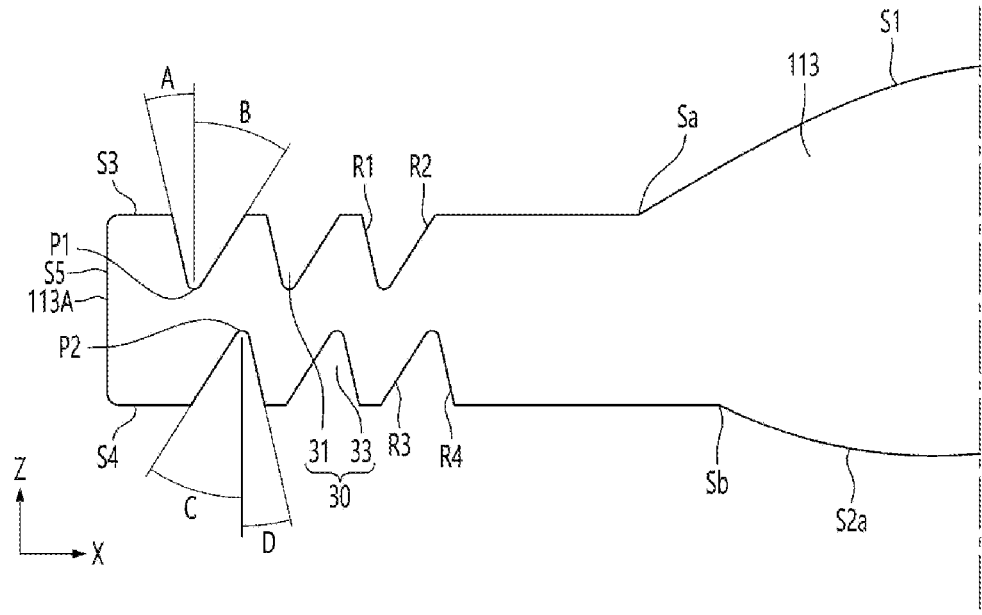
FIG. 13 is another example of the lens of FIG. 9.

The flange portion of the lens and the buffer structure will be described with reference to FIGS. 3 and 4. Referring to FIGS. 3 and 4, the lens 113 may include a first region A1 having an effective diameter through which light travels, and a second region A2 in which light is blocked around the outer circumference of the first region A1. The lens 113 may include a flange portion 113A extending in a direction perpendicular to the optical axis Lz around the first region A1, which is the second region A2. The flange portion 113A may be integrally formed with the lens 113 or made of the same plastic material. The lens 113 may include the first region A1 having an effective diameter having a first surface S1 on the object side where light is incident and a second surface S2 on the image side or sensor side where light is emitted. And, the effective diameter of the first surface S1 and the effective diameter of the second surface S2 may be the same or different. The first surface S1 may be convex toward the object side or concave toward the image side (or the sensor side), and the second surface S2 may be concave toward the object side or convex toward the image side (or the sensor side). The concave or convex structures of the first and second surfaces S1 and S2 may be changed according to lens characteristics and camera types. As another example, as shown in FIG. 13, both the first surface S1 and the second surface S2*a* of the lens 113 may be convex.

The flange portion 113A may include a third surface S3 extending outward from a first edge Sa of the first surface S1 and a fourth surface S4 extending outward from a second nected. The portion where the deepest point is disposed may be an angular surface, a curved surface, or a flat surface. The first groove 31 may have a triangular shape with a wide upper part and a narrow lower part, and the second groove 33 may have a triangular shape with a wide lower part and a narrow upper part, that is, an inverted triangle shape.

Here, configurations with and without a buffer structure in the flange portion of the lens may be distinguished as shown in Table 1. Table 1 is a table measuring the non-offset force and Z-axis change for each lens sample.

TABLE 1

| Sample | Total Keq value (N/mm) | Effective diameter K1 (N/mm) | Flange K2 (N/mm) | Lens expansion F (N) | Flange transition (mm) | Non-offset force (N) in flange (N) | Z-axis change (mm) |
|---|---|---|---|---|---|---|---|
| 1 | 4.8 | 4.8 | | 0.072 | | | 0.015 |
| 2 | 4.2 | 4.8 | 33.6 | | 0.0021 | 0.054 | 0.013 |
| 3 | 3.9 | 3.9 | | 0.0585 | | | |
| 4 | 2.8 | 3.9 | 9.92727 | | 0.0059 | 0.0255 | | edge Sb of the second surface S2. The third surface S3 may include a horizontal plane or an inclined surface. The fourth surface S4 may include a horizontal plane or an inclined surface.

As shown in FIGS. 3 and 5, the flange portion 113A may include one or a plurality of buffer structures 30. The buffer structure 30 may include a first groove 31 concavely arranged on the third surface S3 and a second groove 33 concavely arranged on the fourth surface S4. The first groove 31 and/or the second groove 33 may not overlap the spacers 131 and 133 in the first direction X orthogonal to the optical axis Lz. The upper surface of the first groove 31 may face the lower surface of the first spacer 131 or may overlap in an optical axis direction. The second groove 33 may face the upper surface of the second spacer 133 or may overlap in an optical axis direction. The first groove 31 and the second groove 33 may be alternately arranged on different planes based on the optical axis Lz. The buffer structure 30 having the first groove 31 and the second groove 33 may prevent a decrease in rigidity of the flange portion 113A and may contract or expand according to thermal deformation of the lens 113.

The first groove 31 includes a first groove 31 concave in a direction from the third surface S3 to the fourth surface S4, and one or a plurality of first grooves 31 may be disposed on the third surface S3. When viewed from the top view, the first groove 31 may have a circular shape or a ring shape. The plurality of first grooves 31 may be formed in a circular or ring shape, and the plurality of first grooves 31 may be arranged in concentric circles having different radii. The plurality of first grooves 31 may overlap in a direction orthogonal to the optical axis Lz. The second groove 33 may be concave in a direction from the fourth surface S4 toward the third surface S3. One or a plurality of second grooves 33 may be disposed on the fourth surface S4. When viewed from a top view, the second groove 33 may have a circular shape or a ring shape. The plurality of second grooves 33 may be formed in a circular or ring shape, and the plurality of second grooves 33 may be arranged in concentric circles having different radii. The plurality of second grooves 33 may overlap in a first direction perpendicular to the optical axis. Side cross sections of the first groove 31 and/or the second groove 33 may have a triangular shape. The triangular shape may be a shape in which two points contacting the upper or lower surface and the deepest point are con- In Table 1, the samples 1 and 3 have no buffer structure in the flange portion and a length of the flange portion in the sample 3 is longer than that of sample 1 (see FIG. 6), and sample 2 is a lens having a buffer structure having one groove on the flange portion (see FIG. 3) and sample 4 is a lens having a buffer structure having two grooves (FIG. 5). Samples 1-4 were tested by disposing only the lens holder on the outside without a spacer on the flange portion. The total modulus of elasticity (Keq) of each sample 1-4 is the sum of the moduli of elasticity (K1, K2) at the effective diameter and the flange portion. That is, 1/Keq=1/K1+1/K2. As shown in Table 1, the value of the modulus of elasticity decreases as the length of the flange portion increases, and an elastic modulus Keq of the flange portion having two grooves in the buffer structure is higher than that of the flange portion having one groove in the buffer structure. In addition, it may be seen that the Z-axis change of the lens is improved by the flange portion having the groove. The Z-axis change of the lens may vary depending on the number, depth, or width of grooves. Therefore, in an embodiment of the invention, since the buffer structure 30 having at least two grooves 31 and 33 is provided in the flange portion 113A of the lens 113, thermal expansion of the lens 113 may be relieved with elasticity, and changes on the optical axis, that is, Z-axis, may be suppressed.

As shown in FIG. 7, the plurality of first grooves 31 are spaced apart from each other and may have the same or different depths T2. When the depths T2 of the plurality of first grooves 31 are different from each other, a region adjacent to the first edge Sa of the first region A1, that is, the groove depth adjacent to the first surface S1 is the deepest, a depth of the groove adjacent to the outer surface S5 of the flange portion 113A may be disposed to be the lowest. Conversely, when the depths T2 of the plurality of first grooves 31 are different from each other, the region adjacent to the first edge Sa of the first region A1, that is, the depth of the groove adjacent to the first surface S1 is the lowest, and a groove depth adjacent to the outer surface S5 of the flange portion 113A may be disposed to be the deepest. When the depths T2 of the first grooves 31 are provided differently, the change in expansion of the first grooves 31 in the circumferential direction from the center of the lens 113 may be gradually suppressed. The first edge Sa may be a boundary point between the flange portion 113A and the first surface S1. The depth T2 of the first groove 31 may be less than 50% of the thickness T1 of the flange portion 113A, and may be in a range of 20% or more, 20% to 40%, or 20% to 30% of the thickness T1 of the flange portion 113A. when the depth T2 of the first groove 31 is larger than the above range, it is difficult to mold the lens, and when it is smaller than the above range, the buffer function against lens expansion may deteriorate.

As shown in FIG. 7, the distance F1 between adjacent first grooves 31 may be smaller than the maximum width W1 of the first grooves 31. When the distance F1 between the first grooves 31 is greater than the distance W1, the buffer function in the horizontal direction may deteriorate and a degree to which the lens 113 is deformed in the direction of the optical axis Lz may be increased. Therefore, expansion relaxation in the horizontal direction may be maximized by the depth T2 and the maximum width W1 of the first grooves 31. The plurality of second grooves 33 may be spaced apart from each other and may have the same or different depths T3. When the depths T3 of the plurality of second grooves 33 are different from each other, the depth of the groove adjacent to the second edge Sb or the second surface S2 of the effective region is the deepest, and the depth of the groove adjacent to the outer surface S5 of the flange portion 113A may be disposed to be the lowest. Conversely, when the depths T3 of the plurality of second grooves 33 are different from each other, the depth of the groove of the region adjacent to the second edge Sb of the first region A1 or the groove adjacent to the second surface S2 is the deepest, and the depth of the groove adjacent to the outer surface S5 of the flange portion 113A may be disposed the lowest. When the depths T3 of the second grooves 33 are provided differently, a change in expansion of the second grooves 33 in the circumferential direction from the center of the lens 113 may be gradually suppressed. The second edge Sb may be a boundary point between the flange portion 113A and the second surface S2.

The depth T3 of the second groove 33 may be less than 50% of the thickness T1 of the flange portion 113A, and may be in a range of 20% or more, 20% to 40%, or 20% to 30% of the thickness T1 of the flange portion 113A. When the depth T3 of the second groove 33 is greater than the above range, it is difficult to mold the lens, and when it is less than the above range, the buffer function against lens expansion may deteriorate. A distance F2 between adjacent second grooves 33 may be smaller than a maximum width W2 of the second grooves 33. When the distance F2 between the second grooves 33 is greater than the distance W2, the buffer function in the horizontal direction may deteriorate and the degree of deformation of the lens 113 in the optical axis direction may increase. there is. Accordingly, expansion relaxation in the horizontal direction may be maximized by the depth T3 and the maximum width W2 of the second grooves 33.

The minimum distance M between the first edge Sa of the first region A1 of the lens 113 and the closest first groove 31 may be greater than the maximum width W1 of the first grooves 31, or may be greater than the pitch or period of the first grooves 31. The minimum distance M may be greater than the distance between the outer surface S5 of the flange portion 113A and the first groove 31 closest thereto. That is, the first grooves 31 may be disposed closer to the outer surface S5 than to the first edge Sa. Accordingly, when the first grooves 31 buffer the expansion of the lens in the circumferential direction in the lens 113, the lens holder 513 supporting the first grooves 31 and the outer surface S5 of the flange portion 113A supports the outer surface S5 of the flange portion 113A, thereby improving the buffering effect.

Figure 11:
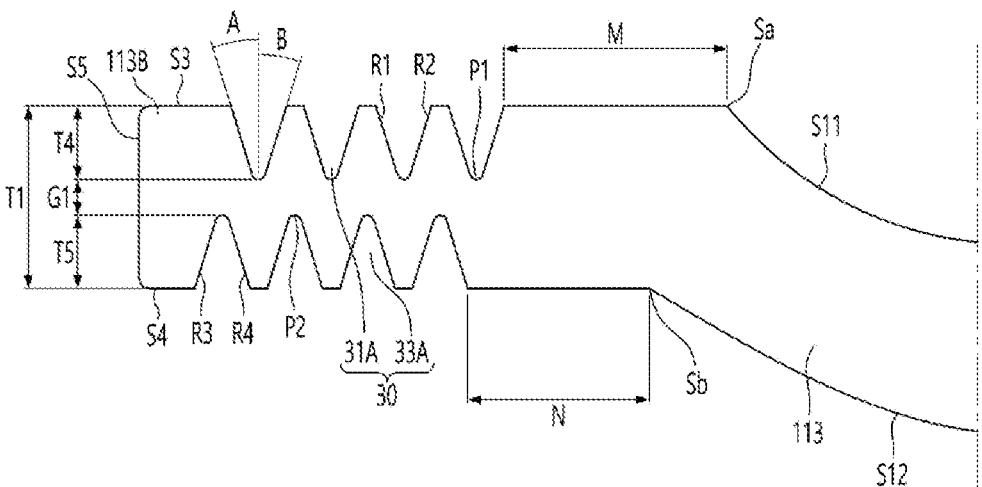
FIG. 11 is another example of a flange portion of a lens in a camera module according to an embodiment of the invention.

The minimum distance N between the second edge Sb of the effective region of the lens 113 and the nearest second groove 33 may be greater than the maximum width W2 of the second grooves 33, and may be greater than the distance between the outer surface S5 of the flange portion 113A and the second groove 33 closest thereto. That is, the second grooves 33 may be disposed closer to the outer surface S5 of the flange portion 113A than to the first edge Sa. Accordingly, the lens holder 513 supporting the second grooves 33 and the outer surface S5 of the flange portion 113A expands the lens in the circumferential direction within the lens through the second grooves 33. Accordingly, the lens holder 513 supporting the second grooves 33 and the outer surface S5 of the flange part 113A may alleviate the lens expansion in the circumferential direction in the lens, and may further increase the relaxation effect by supporting the side surface of the flange portion 113A in the lens holder 513. Here, the minimum distances N and M between the first and second edges Sa and Sb and the first and second grooves 31 and 33 are equal to each other, have a relationship of N>M, or may have a relationship of M<N as shown in FIG. 11.

The minimum distance M and N may be 5% or more of the length of the flange portion 113A of the lens 113, for example, in a range of 5% to 20% or 10% to 15%. The length of the flange portion 113A may be equal to or greater than the thickness T1, 1.5 mm or more, or 2 mm or more.

Referring to FIG. 7, the flange portion 113A has a plurality of first grooves 31 arranged in a circumferential direction in a third surface S3 and a plurality of second grooves 31 in a fourth surface S4. Two or more grooves 33 are arranged in the circumferential direction. The low point P1 which is the lowest point in the first grooves 31 in a direction parallel to the optical axis may be arranged to be shifted from the low point P2 which is the highest point in the second grooves 33 in a horizontal direction. For example, straight line perpendicularly passing through the low points P1 of the first grooves 31 may be alternately arranged with straight line perpendicularly passing through the low points P2 of the second grooves 33. The straight line may be parallel to the optical axis Lz. The shortest distance G between a virtual straight line connecting the low points P1 of the first grooves 31 in a first direction X perpendicular to the optical axis Lz and a virtual straight line connecting the low points P2 of the second grooves 33 in the first direction X perpendicular to the optical axis Lz may be 40% or less of the thickness T1 of the flange portion 113A, or in the range of 20% to 30%, or 20% to 20%. The shortest distance G may be a distance at which the efficiency of injecting the liquid material by the first and second grooves 31 and 33 does not deteriorate when the lens 113 is ejected. The shortest distance G may be 0.2 mm or more, 0.2 mm to 0.3 mm, or 0.2 mm to 0.4 mm.

Referring to FIG. 8, the first groove 31 may include a first outer surface R1 close to the side surface of the flange portion 113A based on the low point P1 and a first inner surface R2 facing the first outer surface R1. The first outer surface R1 may be inclined at a first angle A based on an axis perpendicular to the low point P1, and the first inner surface R2 may be inclined at a second angle B. The first angle A and the second angle B may be the same as or different from each other. The first angle A may be greater than or equal to the second angle B. Accordingly, since the second angle B is provided more than the first angle A, expansion at the upper portion of the lens may be effectively alleviated. The first angle A may be 15 degrees or more, for example, in the range of 15 degrees to 45 degrees. The second angle B may be 45 degrees or less, for example, in the range of 15 degrees to 45 degrees. When the first angle A is less than 15 degrees, elasticity transferred from the first inner surface R2 to the first outer surface R1 may be reduced. When the second angle B is greater than 45 degrees, the expansion force transmitted to the first inner surface R2 may decrease.

As shown in FIG. 9, when the first angle A and the second angle B are different, the second angle B may be greater than the first angle A, and the second angle B may be greater than the first angle A in the range of 10 degrees to 30 degrees. Accordingly, since the second angle B is provided greater than the first angle A, expansion at the upper portion of the lens may be effectively alleviated.

In the buffer structure 30 of the flange portion 113A, the second groove 33 may include a second outer surface R3 close to the side surface of the flange portion 113A based on the low point P2, and a second inner surface R4 facing the second outer surface R3. The second outer surface R3 may be inclined at a third angle C based on an axis perpendicular to the low point P1, and the second inner surface R4 may be inclined at a fourth angle D. The third angle C and the fourth angle D may be the same as or different from each other. The third angle C may be less than the fourth angle D. Accordingly, since the third angle C is provided less than the fourth angle D, expansion in the lower portion of the lens may be effectively alleviated. The fourth angle D may be 15 degrees or more, for example, in a range of 15 degrees to 45 degrees. The third angle C may be 45 degrees or less, for example, in the range of 15 degrees to 45 degrees. When the fourth angle D is less than 15 degrees, the expansion force transmitted to the second inner surface R4 may decrease. When the third angle C is greater than 45 degrees, elasticity transmitted from the second inner surface R4 to the second outer surface R3 may decrease. As the expansion force transmitted to the flange portion 113A decreases, the first region A1 may be deformed in the optical axis direction, which may be difficult to control the change in the optical characteristics (MTF: modulation transfer function) of the lens 113. When the third angle C and the fourth angle D are different, the fourth angle D may be greater than the third angle C, and the fourth angle D may be greater than the third angle C in the range of 10 degrees to 30 degrees.

In the embodiment of the invention, the first spacer 131 may be disposed on the third surface S3 of the flange portion 113A of the lens 113, and the first spacer 131 may face the third surface S3 and cover the first grooves 31. The first spacer 131 has an area larger than that of the upper surface of the first grooves 31 and may adhere to the third surface S3 of the flange portion 113A. The second spacer 133 may be disposed under the fourth surface S4 of the flange portion 113A of the lens 113, and the second spacer 133 may face the fourth surface S4 and may cover the second grooves 33. The second spacer 133 has an area larger than the area of the upper surface of the second grooves 33 and may be in close contact with the fourth surface S4 of the flange portion 113A. The first spacer 131 and the second spacer 133 may press the third surface S3 and the fourth surface S4 of the flange portion 113A. When the lens 113 expands in the circumferential direction, the first spacer 131 and the second spacer 133 may prevent the flange portion 113A from being contacted and the flange portion 113A from being deformed in a vertical direction by elasticity of the first grooves 31 and the second grooves 33. In an embodiment of the invention, the first surface S1 of the lens 113 may be convex and the second surface S2 may be concave, or the first surface S1 may be convex and the second surface S2 may be convex, In the flange portion 113A, the second groove 33 may be disposed closer to the effective region than the first groove 31.

As shown in FIG. 10(A), the shortest distance G between the low point P1 of the first groove 31 and the low point P2 of the second groove 33 in the flange portion 113A may be less than 30% of the thickness T1 of the flange portion 113A, as shown in FIG. 10(B), when the distance G2 is 30% or more of the thickness T1 of the flange portion 113A, when an inner angle of the first groove 31 or the second groove 33 are the same, the number of arrangements of the first grooves 31 and the second grooves 33 may increase or decrease by the difference between the depths T2 and T3 of the first grooves 31 and the second groove s33.

Referring to FIG. 11, the flange portion 113B of the lens 113 may include a buffer structure having a first groove 31A on the third surface S3 and a second groove 33A on the fourth surface S4. The buffer structure may be arranged in the order of the first groove 31A and the second groove 33A based on the optical axis. In the buffer structure, the depth T4 of the first groove 31A and the depth T5 of the second groove 33A may be the same or different. The depth T4 of the first groove 31A may be 20% or more of the thickness T1 of the flange portion 113A, for example, in a range of 20% to 30% or 20% to 40%. The depth T5 of the second groove 33A may be 20% or more of the thickness T1 of the flange portion 113A, for example, in a range of 20% to 30% or 20% to 40%. The inclined first angle A of the first outer surface R1 and the inclined second angle B of the first inner surface R2 based on a straight line perpendicular to the low point P1 of the first groove 31A may be the same as or different from each other. The first angle A may be 45 degrees or less, for example, in the range of 15 degrees to 45 degrees. The second angle B may be 15 degrees or more, for example, in a range of 15 degrees to 45 degrees. When the first angle A and the second angle B are different, the second angle B may be greater than the first angle A, and the second angle B may be greater than the first angle A in the range of 10 degrees to 30 degrees. In the second groove 33A, the inclination angle of the second inner surface R4 may be greater than the inclination angle of the second outer surface R3. Accordingly, in the first groove 31A of the flange portion 113B, the first outer surface R1 is inclined more than the first inner surface R2, and the second inner surface R4 in the second groove 33A is inclined to the second inner surface R2. When inclined more than the outer surface R3, the transmitted lens expansion may be alleviated.

Figure 12:
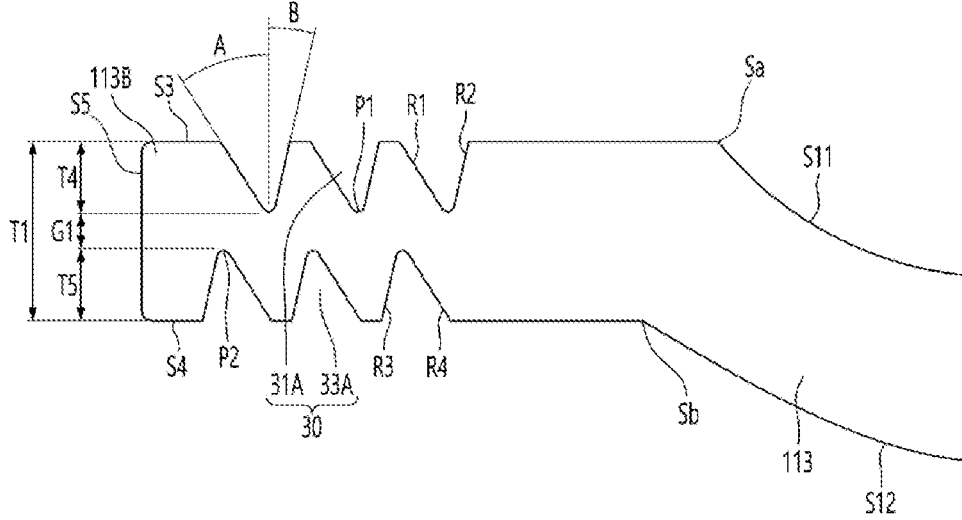
FIG. 12 is a detailed example of a flange portion of the lens of FIG. 11.

As shown in FIGS. 11 and 12, the first surface S11 of the lens 113 is concave and the second surface S12 is convex, or the first surface S11 is convex and the second surface S12 is concave. In the flange portion 113B, the first groove 31A may be disposed closer to the effective region than the second groove 33A. That is, the first groove 31A and the second groove 33A may be arranged in a zigzag form based on the optical axis.

As shown in FIG. 13, both the first surface S1 and the second surface S2a of the lens 113 may be convex, and as another example, at least one of the first and second surfaces is concave or convex, or the both surfaces may be concave. Table 2 is a value obtained by measuring the amount of change in the Z-axis direction of the lens according to the presence or absence of the buffer structure for comparison between the comparative example and the embodiment of the invention.

17

TABLE 2

| Angles (A/B, D/C) | Change (μm) in Z-axis at shortest distance(G) | Change (μm) in Z-axis at shortest distance(G2) |
|---|---|---|
| 비교 예 | 37.088 | 37.088 |
| 15/15 | 24.42 | 27.187 |
| 15/30 | 24.777 | 28.661 |
| 15/45 | 25.527 | 28.595 |
| 30/30 | 26.798 | 28.989 |
| 30/45 | 25.501 | 28.448 |
| 45/45 | 23.367 | 29.5 |

It may be seen that the Z-axis change in the lens having the flange portion having the buffer structure is reduced compared to the comparative example in which the flange portion of the lens has no buffer structure. In addition, it may be seen that when the angles A<B and D<C in the first groove and the second groove, the Z-axis change is further reduced. In addition, it may be seen that when the sizes of the first and second grooves are large based on the shortest distance (G<G2) between the first groove and the second groove, a higher Z-axis change is reduced.

Figure 14:
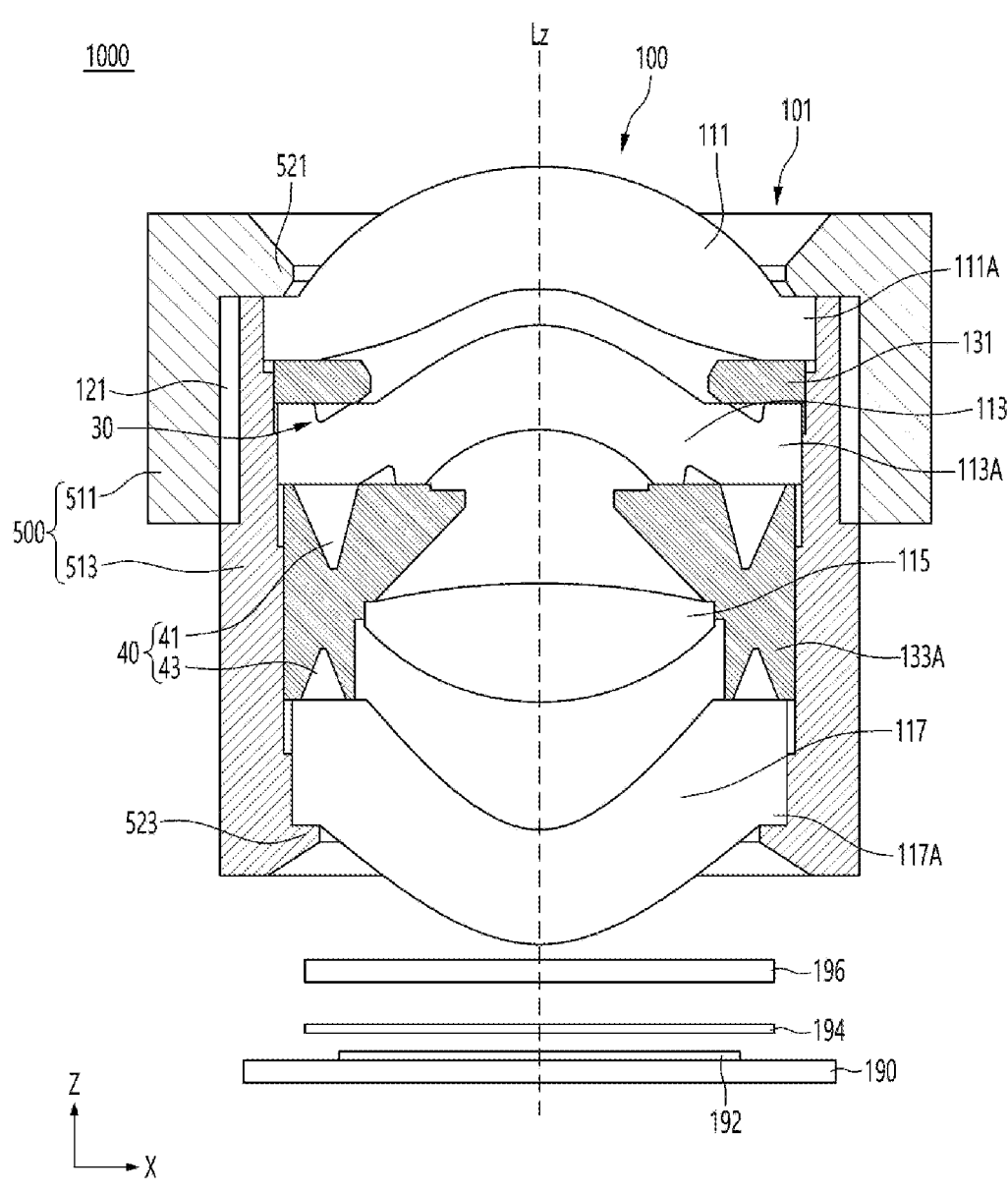
FIG. 14 is an example of a side cross-sectional view having a buffer structure in a lens and a spacer in a camera module according to an embodiment of the invention.

As shown in FIG. 14, the camera module 1000 may define the buffer structure 30 of the lens 113 as a first buffer structure and a buffer structure 40 of the spacer 133A as a second buffer structure. The spacer 133A having the second buffer structure 40 may be disposed on at least one or two or more of the first to fourth lenses. The first buffer structure 30 of the lens 113 will be referred to the description of the embodiment disclosed above, and the second buffer structure 40 of the spacer 133A will be described below. The second buffer structure 40 is disposed on the spacer 133A outside the flange region of the third lens 115, and may include at least one groove on the upper and lower surfaces of the spacer 113A. One or a plurality of first grooves 41 may be disposed from the upper surface toward the lower surface of the spacer 133A. One or a plurality of second grooves 43 may be disposed from the lower surface toward the upper surface of the spacer 133A.

The spacer 133A having the second buffer structure 40 may be disposed between the second lens 113 and the fourth lens 117. The second buffer structure 40 may contact the second lens 113 and the fourth lens 117. The second buffer structure 40 may contact an outer side surface of the third lens 115. The concave groove 41 on the upper surface of the second buffer structure 40 may face the lower surface of the flange portion 113A of the second lens 113. The concave groove 43 on the lower surface of the second buffer structure 40 may face the upper surface of the flange portion 117A of the fourth lens 117. Each of the upper and lower grooves 41 and 43 of the second buffer structure 40 may not overlap a region of the effective diameter of the third lens 115 in the first direction X orthogonal to the optical axis Lz. Since the upper and lower grooves 41 and 43 of the second buffer structure 40 are not overlapped with the outer side surface of the third lens 115 in the first direction X orthogonal to the optical axis Lz, thermal expansion of the third lens 115 may be buffered in the different grooves 41 and 43.

The third lens 115 disposed inside the spacer 133A to which the second buffer structure 40 is applied may be made of a plastic material. The second buffer structure 40 applied to the spacer 133A supporting the third lens 115 made of plastic according to an embodiment of the invention may buffer the volume of the third lens 115 when the volume of the third lens 115 expands according to the ambient temperature. The second buffer structure 40 may be provided on the spacer 133A disposed outside the flange region of the third lens 115, and may provide in a structure that provides elasticity in a direction orthogonal to the optical axis Lz or in a circumferential direction.

Figure 15:
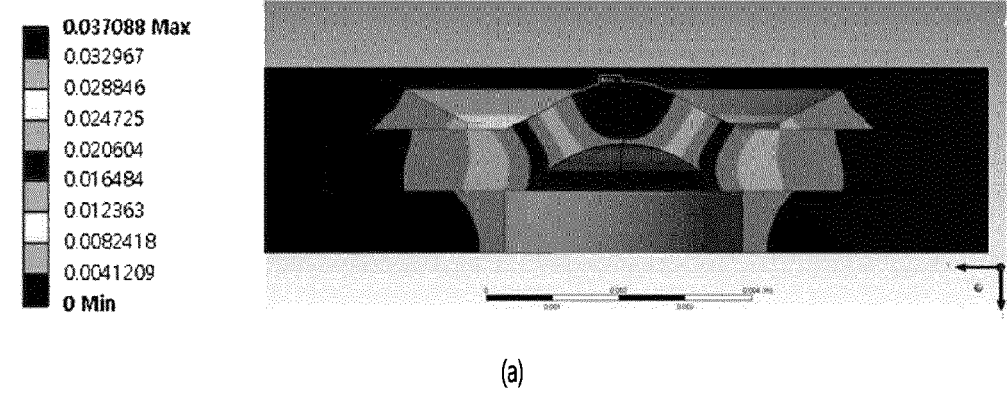
FIG. 15(A) is a thermal characteristic of a lens according to a comparative example, and (B) is a diagram showing thermal characteristics of the lens of FIG. 7.
Figure 15:
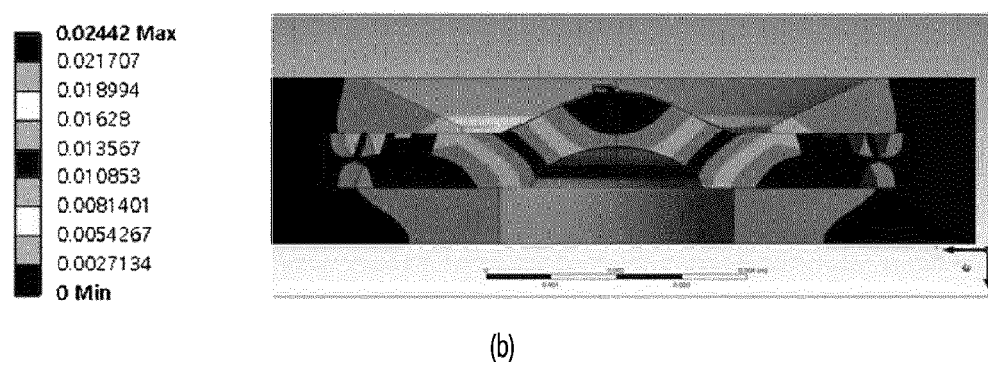
Figure 16:
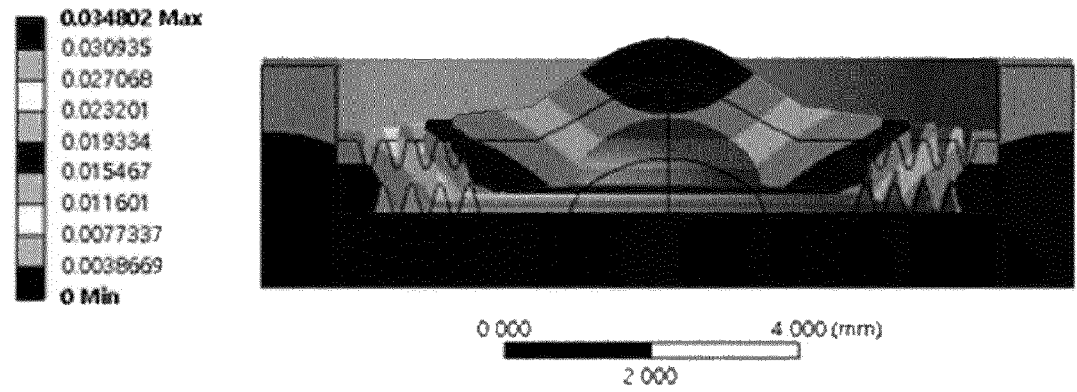
FIG. 16 is a view showing lens deformation in a structure without a spacer in the lens of FIG. 7.

FIG. 15(A) is a Z-axis change amount (unit, mm) of a lens of a comparative example, and FIG. 15(B) is a Z-axis change amount (unit, mm) of a lens according to an embodiment of the invention. As shown in FIG. 15(A), in the comparative example, there is no buffer structure on the flange portion of the lens, and it may be seen that the change amount (unit, mm) in the Z-axis direction in the effective region of the lens protrudes higher than the change amount of lens of FIG. 15(B). Further, as shown in FIG. 16, when there is no spacer on the flange portion of the lens, it may be seen that a large amount of change in the Z-axis direction of the lens occurs even if the lens has a buffer structure. In this case, by disposing spacers or protrusions of other lens holders on the third and fourth surfaces of the flange portion having the buffer structure, the amount of change in the Z-axis direction of the lens may be suppressed due to the elastic effect of the buffer structure in the flange portion.

An embodiment of the invention is a change from a low temperature of −20 degrees or less to a high temperature of 70 degrees or more, for example, in the case of a change from −40 degrees to 85 degrees in a camera module of a vehicle, in applying a plastic lens, since the buffer structure has grooves in the outer flange portion of the plastic lens, the buffer structure provides contraction or expansion elasticity for expansion of the plastic lens due to temperature change, thereby suppressing the amount of change in the optical axis direction of the effective region of the lens. Accordingly, it is possible to reduce a change in optical characteristics of a camera module employing a plastic lens.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is merely an example and does not limit the invention, and those of ordinary skill in the art will understand that various modifications and applications not exemplified are possible without departing from the essential characteristics of the present embodiment. For example, each component specifically shown in the embodiment can be implemented by modification. And differences related to such modifications and applications should be construed as being included in the scope of the invention defined in the appended claims.

The invention claimed is:

1. A camera lens for a vehicle comprising:
a first region having an effective diameter having an object-side first surface and an image-side second surface; and
a flange portion disposed around the first region and having a third surface extending outwardly from a first edge of the first surface and a fourth surface extending outwardly from a second edge of the second surface, the flange portion being an optically non-effective region,
wherein the flange portion includes a plurality of first grooves concave from the third surface toward the fourth surface of the flange portion, and a plurality of second grooves concave from the fourth surface toward the third surface, wherein the first edge is a boundary point between the flange portion and the first surface, wherein the second edge is a boundary point between the flange portion and the second surface, and wherein a minimum distance between the first edge and an inner first groove of the plurality of first grooves closest to the first edge is greater than a distance between adjacent first grooves of the plurality of first grooves, and wherein the minimum distance between the inner first groove closest to the first edge and the first edge is greater than a distance between an outer surface of the flange portion and an outer first groove of the plurality of first grooves closest to the outer surface of the flange portion.

2. The camera lens for a vehicle of claim 1, wherein each of the plurality of first grooves has a ring shape having different radii in the third surface and is arranged in concentric circle shape.

3. The camera lens for a vehicle of claim 2, wherein each of the plurality of second grooves has a ring shape having different radii in the fourth surface and is arranged in a concentric circle shape, and wherein a low point of each of the plurality of first grooves and a high point of each of the plurality of second grooves are arranged to be shifted from each other.

4. The camera lens for a vehicle of claim 3, wherein the distance between the adjacent first grooves is smaller than a maximum width of each of the first grooves, and wherein an interval between the plurality of second grooves is smaller than a maximum width of at least one of the second grooves.

5. The camera lens for a vehicle of claim 3, wherein the minimum distance between the inner first groove closest to the first edge and the first edge of the first region is smaller than a minimum distance between an inner second groove of the plurality of second grooves closest to the second edge and the second edge of the first region.

6. The camera lens for a vehicle of claim 1, wherein the first surface is convex toward an object side, and wherein the second surface is concave toward an object side.

7. The camera lens for a vehicle of claim 1, wherein each of the plurality of first grooves has a first outer surface adjacent to the flange portion and a first inner surface adjacent to the first region, and wherein the first inner surface and the first outer surface are inclined based on a straight line passing through low points of the first grooves and parallel to an optical axis.

8. The camera lens for a vehicle of claim 7, wherein each of the plurality of second grooves has a second outer surface adjacent to the flange portion and a second inner surface adjacent to the first region, and wherein the second inner surface and the second outer surface are inclined based on a straight line passing through high points of the second grooves and parallel to the optical axis.

9. The camera lens for a vehicle of claim 8, wherein an inclination angle of the first inner surface based on a straight line parallel to the optical axis is equal to or greater than an inclination angle of the first outer surface, and wherein an inclination angle of the second inner surface based on the straight line parallel to the optical axis is equal to or smaller than an inclination angle of the second outer surface.

10. The camera lens for a vehicle of claim 1, wherein a shortest distance between a virtual first straight line connecting low points of the first grooves and a virtual second straight line connecting low points of the second grooves in a first direction perpendicular to an optical axis is in a range of 20% to 40% of a thickness of the flange portion.

11. A camera module comprising:

a plurality of lenses stacked from an object side toward an image side; and spacers respectively disposed on an outer circumference between adjacent lenses, wherein at least a first lens of the plurality of lenses includes:

a first region having an effective diameter having an object-side first surface and an image-side second surface; and a flange portion disposed around the first region and having a third surface extending outwardly from a first edge of the first surface and a fourth surface extending outwardly from a second edge of the second surface, wherein the spacers are configured to block light from reaching the flange portion, the flange portion being an optically non-effective region, wherein the flange portion includes:

a plurality of first grooves concave from the third surface of the flange portion toward the fourth surface; and a plurality of second grooves concave from the fourth surface toward the third surface, wherein the spacers include a first spacer facing the third surface of the flange portion and covering the plurality of first grooves and a second spacer facing the fourth surface of the flange portion and covering the plurality of second grooves, wherein the first edge is a boundary point between the flange portion and the first surface, wherein the second edge is a boundary point between the flange portion and the second surface, wherein a minimum distance between the first edge and an inner first groove of the plurality of first grooves closest to the first edge is greater than a distance between adjacent first grooves of the plurality of first grooves, and wherein the minimum distance between the inner first groove closest to the first edge and the first edge is greater than a distance between an outer surface of the flange portion and an outer first groove of the plurality of first grooves closest to the outer surface of the flange portion.

12. The camera module of claim 11, comprising a lens holder disposed outside the plurality of lenses, wherein the lens holder is made of metal, wherein the first lens is a plastic material, and wherein the plurality of lenses includes a second lens made of glass on the object side or the image side of the first lens.

13. The camera module of claim 11, wherein each of the plurality of first grooves has a ring shape having different radii in the third surface and is arranged in a concentric circle shape, wherein each of the plurality of second grooves has a ring shape having different radii in the fourth surface and is arranged in a concentric circle shape, and wherein a low point of each of the plurality of first grooves and a high point of each of the plurality of second grooves are disposed to be shifted from each other.

14. The camera module of claim 11, wherein the distance between the adjacent first grooves is smaller than a maximum width of each of the first grooves, wherein a distance between adjacent second grooves of the plurality of second grooves is smaller than a maximum width of each of the second grooves, and wherein the minimum distance between the first edge and the inner first groove closest to the first edge is smaller than a minimum distance between the second edge and an inner second groove of the plurality of second grooves closest to the second edge.

15. The camera module of claim 11, wherein the first surface of the first lens is convex toward the object side, wherein the second surface of the first lens is concave toward the object side, wherein each of the plurality of first grooves has a first outer surface adjacent to the flange portion and a first inner surface adjacent to the first region, wherein the first inner surface and the first outer surface are inclined based on a straight line passing through low points of the first grooves and parallel to an optical axis, wherein each of the plurality of second grooves has a second outer surface adjacent to the flange portion and a second inner surface adjacent to the first region, and wherein the second inner surface and the second outer surface are inclined based on a straight line passing through high points of the second grooves and parallel to the optical axis.

16. A camera module comprising:

a plurality of lenses arranged along an optical axis; and a spacer disposed on an outer circumference between adjacent lenses, wherein a first lens of the plurality of lenses comprises:

a first region having an effective diameter having an object-side first surface and an image-side second surface; and a flange portion disposed around the first region and having a third surface extending outwardly from a first edge of the first surface and a fourth surface extending outwardly from a second edge of the second surface, wherein the spacer is configured to block light from reaching the flange portion, the flange portion being an optically non-effective region, wherein the flange portion comprises:

a plurality of first grooves concave from the third surface of the flange portion toward the fourth surface; and a plurality of second grooves concave from the fourth surface toward the third surface, wherein the first edge is a boundary point between the flange portion and the first surface, wherein the second edge is a boundary point between the flange portion and the second surface, wherein the plurality of first grooves and the plurality of second grooves are arranged in a direction perpendicular to the optical axis of the plurality of lenses, wherein a depth of the first groove adjacent to the first edge and a depth of the first groove adjacent to an outer surface of the flange portion are different from each other, wherein a minimum distance between the first edge and an inner first groove of the plurality of first grooves closest to the first edge is greater than a distance between adjacent first grooves of the plurality of first grooves, and wherein the minimum distance between the inner first groove closest to the first edge and the first edge is greater than a distance between an outer surface of the flange portion and an outer first groove of the plurality of first grooves closest to the outer surface of the flange portion.

17. The camera module of claim 16, wherein each of the plurality of first grooves has a ring shape having different radii in the third surface and is arranged in a concentric circle shape, wherein each of the plurality of second grooves has a ring shape having different radii in the fourth surface and is arranged in a concentric circle shape, and wherein a low point of each of the plurality of first grooves and a high point of each of the plurality of second grooves are arranged to be shifted from each other.

18. The camera module of claim 16, wherein the distance between the adjacent first grooves is smaller than a maximum width of at least one of the first grooves, and wherein a distance between adjacent second grooves of the plurality of second grooves is smaller than a maximum width of at least one of the second grooves.

19. The camera module of claim 16, wherein the minimum distance between the first edge and the first groove closest to the first edge is smaller than a minimum distance between the second edge and an inner second groove of the plurality of second grooves closest to the second edge.

20. The camera module of claim 16, comprising a lens holder disposed outside the plurality of lenses, wherein the plurality of lenses includes a lens made of plastic and a lens made of glass, wherein the lens holder is made of metal, wherein the first lens is a plastic material, and wherein the spacer covers the plurality of first grooves or the plurality of second grooves.

* * * * *